Dec. 1, 1942.

H. M. DOBBS 2,303,919

COMPENSATING BRINE SYSTEM

Filed Oct. 14, 1938

INVENTOR.
HENRY M. DOBBS.
BY Victor J. Evans & Co.
ATTORNEYS

Patented Dec. 1, 1942

2,303,919

UNITED STATES PATENT OFFICE 2,303,919

COMPENSATING BRINE SYSTEM

Henry M. Dobbs, Gardena, Calif.

Application October 14, 1938, Serial No. 235,035

2 Claims. (Cl. 62—101)

This invention relates to a brine system for preserving fish.

An object of the invention is to provide a system for preserving fish meats after the catch and during the return trip to the unloading point.

Another object is to provide an improved means for fish storage and bait tanks in which the water may be kept fresh and clean.

Figure 2:
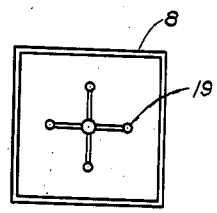
Figure 3:
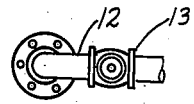
Figure 1:
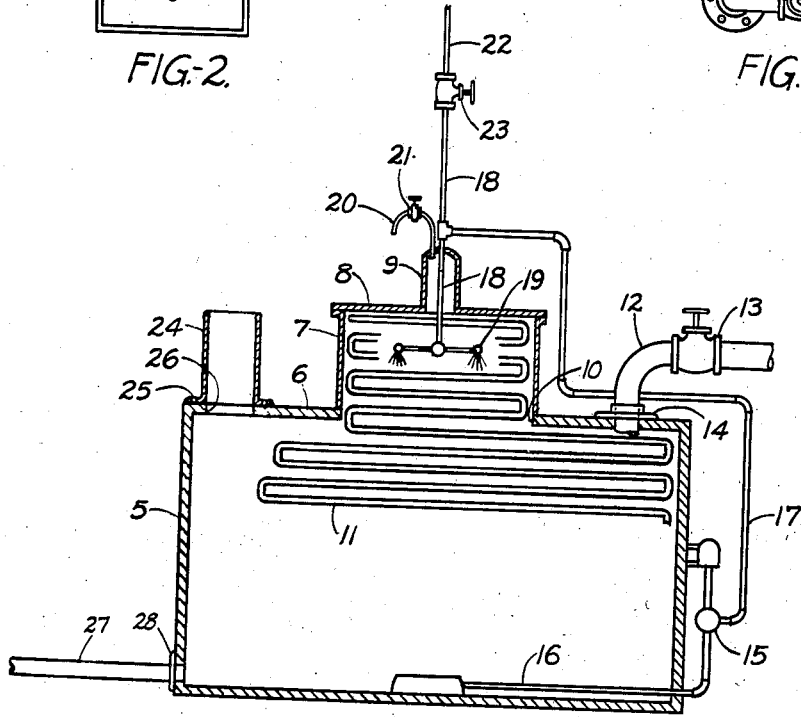
Figure 4:
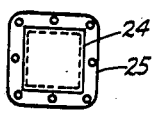

Other objects and advantages will appear and be brought out more fully in the following specification, reference being had to the accompanying drawing wherein Fig. 1 is an elevation view in section of an embodiment of my invention and Figs. 2, 3 and 4 are detailed views of parts of the same.

Referring more particularly to the drawing, I show a bait and fish tank 5 adapted to be mounted on the deck of a fishing vessel, the tank having a top 6 provided with a hatch 7 and a cover 8 therefor, the hatch being suitably flanged to provide attachment of cover 8. Cover 8 is provided with a dome 9 and top 6 of tank 5 has an opening 10 through which extend the usual refrigeration coils 11 for cooling the water in tank 5 when used for fish storage.

A water feed pipe 12 provided with a valve 13 connects with tank 5 through a removable flange 14 such that pipe 12 and flange 14 may be removed and the opening blanked when it is desired to fill the tank above the level of top 6 when used for fish storage as will be apparent hereinafter.

A pump 15 is connected to a pipe 16 in the bottom of tank 5 from which it circulates the tank water through pipes 17 and 18 to a plurality of jets 19 positioned in the upper portion of hatch 7. An air vent 20 provided with a valve 21 is positioned in dome 9 for removing dead air to arrest the decaying of the stored fish. Fresh sea water may be supplied through a pipe 22 by a control valve 23 connected to pipe 18.

A vent stack 24 provided with a suitable flange 25 is positioned over an aperture 26 in top 6 and may be removed and aperture 26 blanked off similar to pipe 12 and flange 14. A bait water discharge pipe 27 is connected to tank 5 by a flange 28 and provided with a suitable control valve.

When used for live bait the water level in tank 5 is below that of top 6 so that the surface is ventilated by air which may enter stack 24 and leave through pipe 20.

When the openings have been blanked off, tank 5 can be completely filled with water from inlet pipes 22 and 18 and the displaced air bled off through pipe 20 and valve 21 in order to keep a constantly renewed supply of fresh sea water and also to keep out air from the interior of the tank so as to prevent bacterial action and decay as much as possible when used for storage of caught fish.

A circulation of water through the tank and across the contents thereof can be maintained by blanking off opening 26 and that adjacent flange 14 controlling the discharge through pipe 27, and adding water through pipes 22, 18 and 19.

On the outgoing trip tank 5 will ordinarily be used for bait and sea water will be supplied through pipe 12 and discharged through pipe 27, aperture 26 being kept open for ventilation. This water may be partially cooled by cooling coils 11 if desired. After the catch has been made the tank will be used for preserving the same, and flanged opening 14 and aperture 26 will be blanked off. The catch will then be preserved in tank 5 by fresh sea water supplied from pipe 22 and the excess thereof removed through pipe 27. During such time as fresh sea water is not being added to the tank, the water therein may be circulated by pump 15 and pipes 16, 17 and 18. This water will preferably be cooled by refrigeration coils 11.

Having described my invention, what I claim is:

1. A combination water and fish storage tank adapted to be closed to the atmosphere, and having refrigeration coils therein, a water inlet, an outlet, a pipe circulating system for the contents of said tank including a pump, a pipe of said system being connected to said inlet, a dome for said tank, and a valve bleeder pipe leading from said dome.

2. A combination water and fish storage tank having cooling coils therein, a water inlet, an outlet, a valved bleeder pipe leading from said tank, circulating means for the contents of said tank including a pump, a pipe inlet in said tank, said pipe inlet having a plurality of jets.

HENRY M. DOBBS.